June 23, 1953  C. HETTINGER  2,642,821
METHOD INVOLVED IN THE APPARATUS FOR MECHANICALLY
APPLYING SEEDS TO DOUGH FORMS Original Filed Oct. 20, 1950  2 Sheets-Sheet 1

*INVENTOR.*
CHARLES HETTINGER
BY
ATTORNEY

June 23, 1953     C. HETTINGER     2,642,821
METHOD INVOLVED IN THE APPARATUS FOR MECHANICALLY
APPLYING SEEDS TO DOUGH FORMS
Original Filed Oct. 20, 1950     2 Sheets—Sheet 2

INVENTOR.
CHARLES HETTINGER
BY
ATTORNEY

Patented June 23, 1953

2,642,821

UNITED STATES PATENT OFFICE 2,642,821

METHOD INVOLVED IN THE APPARATUS FOR MECHANICALLY APPLYING SEEDS TO DOUGH FORMS

Charles Hettinger, Englewood, N. J.

Original application October 20, 1950, Serial No. 191,262. Divided and this application April 10, 1952, Serial No. 281,524

2 Claims. (Cl. 107—54)

This invention relates to the method involved in the apparatus for mechanically applying seeds or other fine solids to dough forms prior to baking, as disclosed in my co-pending application for patent filed October 20, 1950, Serial No. 191,262. This application is a division thereof.

In carrying out the invention, I have devised a main frame which supports a pair of receptacles—one directly in advance of the other. One receptacle contains a suitable moistening agent and a conveyor partially submerged in the moistening agent. The other receptacle, by way of example, contains poppy seeds, and is likewise equipped with a conveyor which carries the seeds above the top of the receptacle. Dough forms are fed to the first conveyor which moistens the bottoms of the forms. Then the forms are transferred to the second conveyor and due to the moist condition of the forms, the seeds presented by said conveyor adhere to the forms, and in this condition the latter are passed on to an oven, and baked. By moistening the bottoms of the dough forms, the seeds adhere only to such moistened bottoms, and thus by the method disclosed, the application of the seeds can be accomplished expeditiously, without turning the dough over and without depositing the seed from the top, and without waste. Also by applying the seed from the bottom, the pressure of the weight of the dough gives a firm bond therewith and a uniform distribution of seeds on the dough. When it is deposited on the dough from the top, the seeds do not adhere to the dough piece and during proofing (raising) and backing of the dough, the seeds tend to fall off, and a non-uniform distribution of the seeds is accomplished. My method eliminates these objections.

Figure 1:
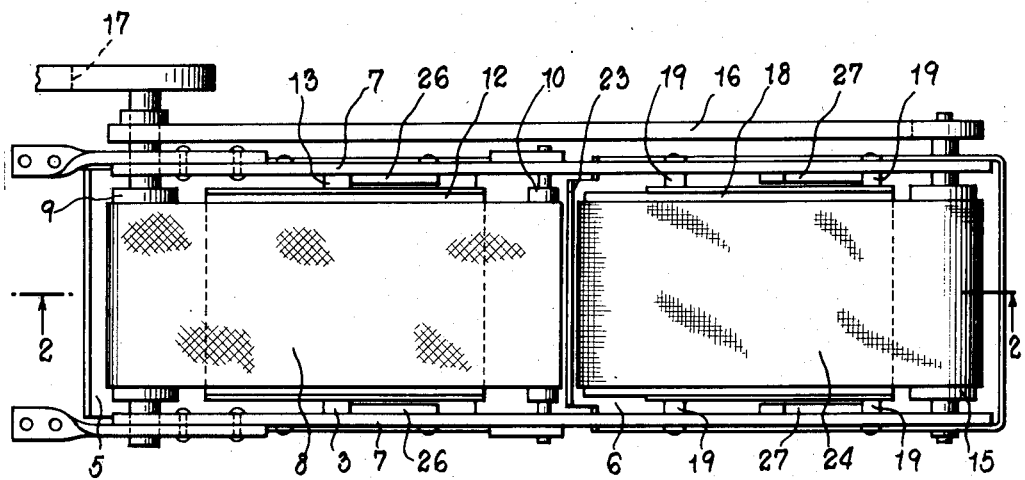
Fig. 1 is a top plan view of the complete machine.

Essentially, the invention comprises a pair of semi-circular receptacles 5—6 suitably supported and depending from a rectangular frame 7. Operating within receptacle 5 is a conveyor belt 8, preferably made of canvas or similar material having a definite characteristic of capillary attraction, and trained over drive roll 9 and guide rolls 10—11 in a form simulating an inverted right-angled triangle. The belt further transverses a bed 12 which is sustained by brackets 13, connected to frame 7 and extends transversely of receptacle 5 and medially of the belt set-up.

Figure 2:
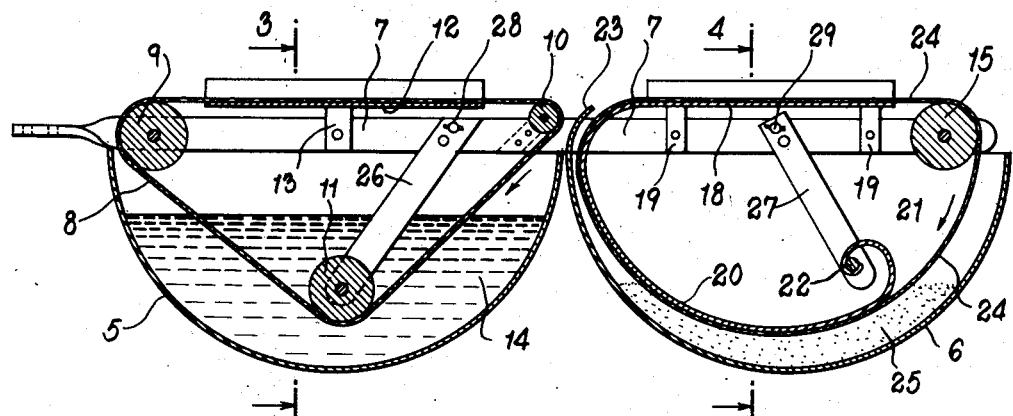
Fig. 2 is a longitudinal section along lines 2—2 of Fig. 1.
Figure 3:
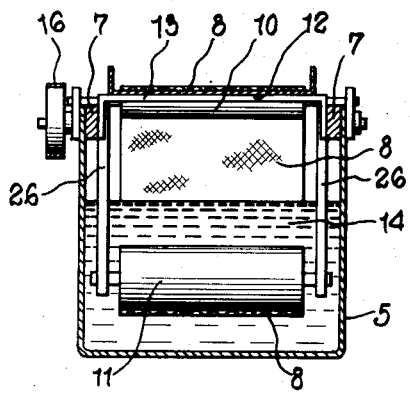
Fig. 3 is a transverse section taken on lines 3—3 of Fig. 2.
Figure 4:
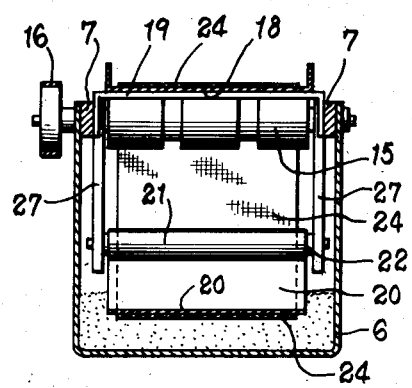
Fig. 4 is a transverse section along lines 4—4 of Fig. 2.
Figure 5:
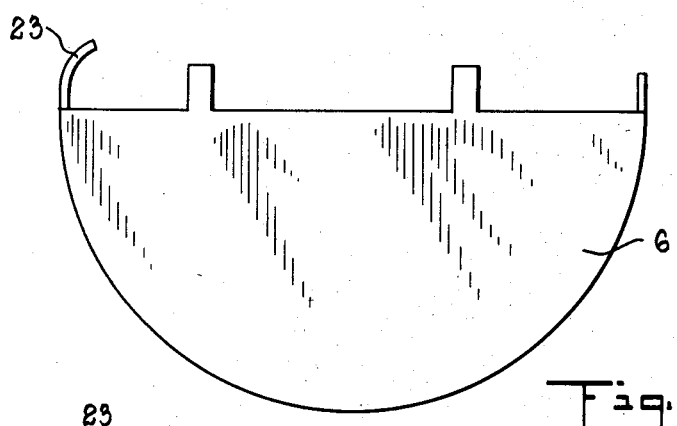
Fig. 5 is a detailed view of the receptacle designed to contain seeds.
Figure 6:
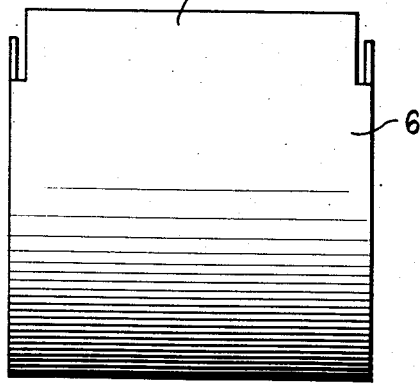
Fig. 6 is an end view of the receptacle.

As clearly shown in Fig. 2, receptacle 5 is designed to be partially filled with water 14, and a portion of belt 8 is submerged therein.

Receptacle 6 is of similar conformation with respect to receptacle 5, and lies directly forward thereof. At its outer upper end, receptacle 6 is provided with a drive roll 15 connected by belt 16 to drive roll 9, which latter is connected to driven pulley 17. Receptacle 6 is also equipped with a bed 18, supported relatively to frame 7 by a pair of brackets 19, but in the present instance, the rear portion of the bed is extended and curved downwardly beneath the bed so as to constitute an apron 20. The end of the apron is curled inwardly at 21 and secured to the transverse rod 22. Otherwise, the contour of the apron as respects the shape of receptacle 6 is convergent from its outer end towards lip 25 of the receptacle.

Passing over roll 15, bed 18, and apron 20 is a conveyor 24, shown in the present instance, as being constructed of fine mesh screen or other like reticulated material, which will pick up seeds 25 in receptacle 6 and carry them to bed 18.

Guide roll 11 is mounted on the ends of bars 26, and rod 22 is carried by like bars 27. Both pairs of bars may be adjusted, respectively, by wing nuts 28—29.

Dough, in any desired form, is fed to belt 8 at the point just above drive roll 9. The fact that the belt is saturated with water contained in receptacle 5, moistens the bottoms of the dough forms as they are carried over bed 12 on to screen 24. The moist dough thus causes the seeds held in the interstices of the screen to free themselves and to adhere to the dough forms in an equidistantly spaced pattern, which are then transferred to a baking oven.

I reserve the right to make such changes or modifications as may come within the scope of the appended claims:

I claim:

1. The method of applying edible units to dough forms which consists of continuously moving spaced dough forms along a predetermined, substantially horizontal path, spanning in substantially vertical, spaced relationship, a material source of moisture and a material source of edible units, continuously moving at substantially the same rate as said dough forms moisture and edible units from said sources to successive regions of said path, successively applying said moisture and edible units to the undersurface of the said moving dough forms.

2. The method of continuously moving spaced dough forms at a predetermined rate along a predetermined, substantially horizontal path, spanning in vertically spaced relationship, a material source of moisture and a material source of edible units, continuously moving at the same rate as said dough forms, moisture and edible units from said sources to successive regions of said path, successively applying said moisture and edible units to the undersurfaces of the said moving dough forms.

CHARLES HETTINGER.

References Cited in the file of this patent

UNITED STATES PATENTS

| Number | Name | Date |
|---|---|---|
| 229,320 | Lampert | June 29, 1880 |
| 1,524,230 | Bausman | Jan. 27, 1925 |
| 1,759,608 | Ehrhart | May 20, 1930 |
| 1,801,572 | Salerno | Apr. 21, 1931 |
| 1,966,268 | Steffen | July 10, 1934 |
| 2,092,836 | Engels et al. | Sept. 14, 1937 |
| 2,119,909 | Ferry | June 7, 1938 |
| 2,173,000 | Holtzman et al. | Sept. 12, 1939 |
| 2,347,164 | Petrilli | Apr. 18, 1944 |